Figure 1:
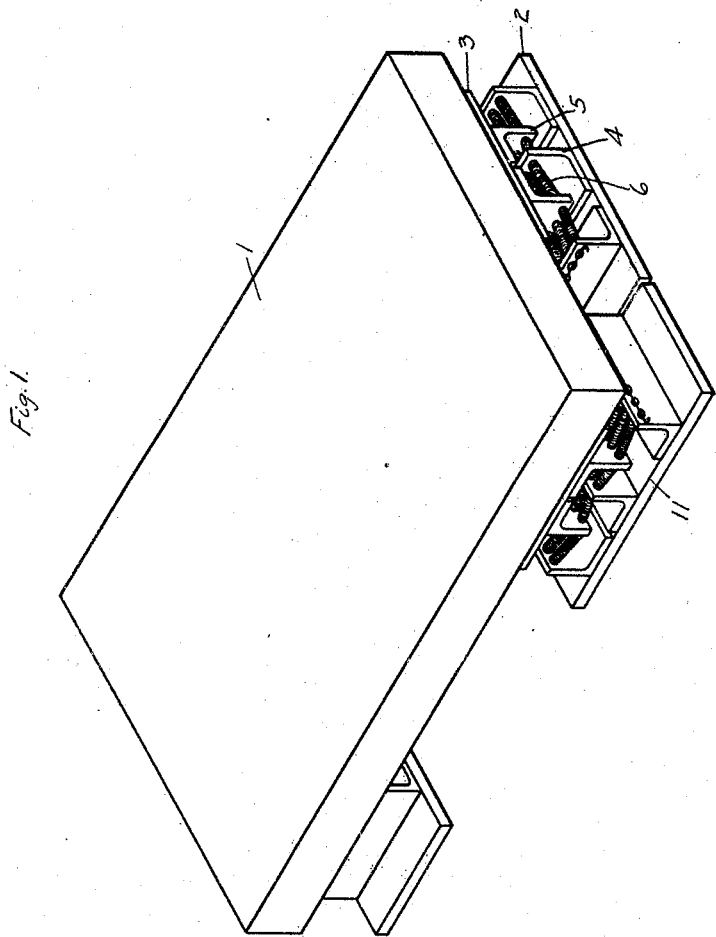

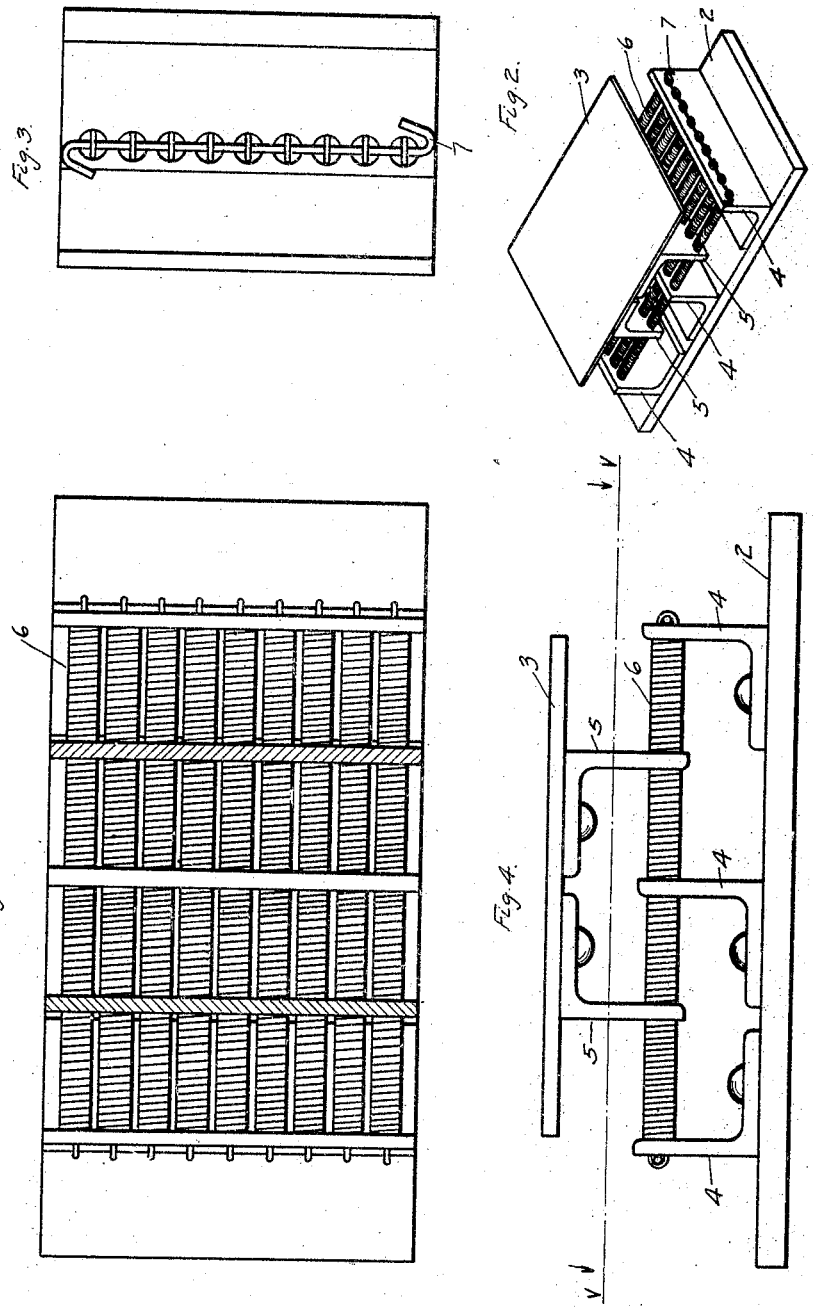

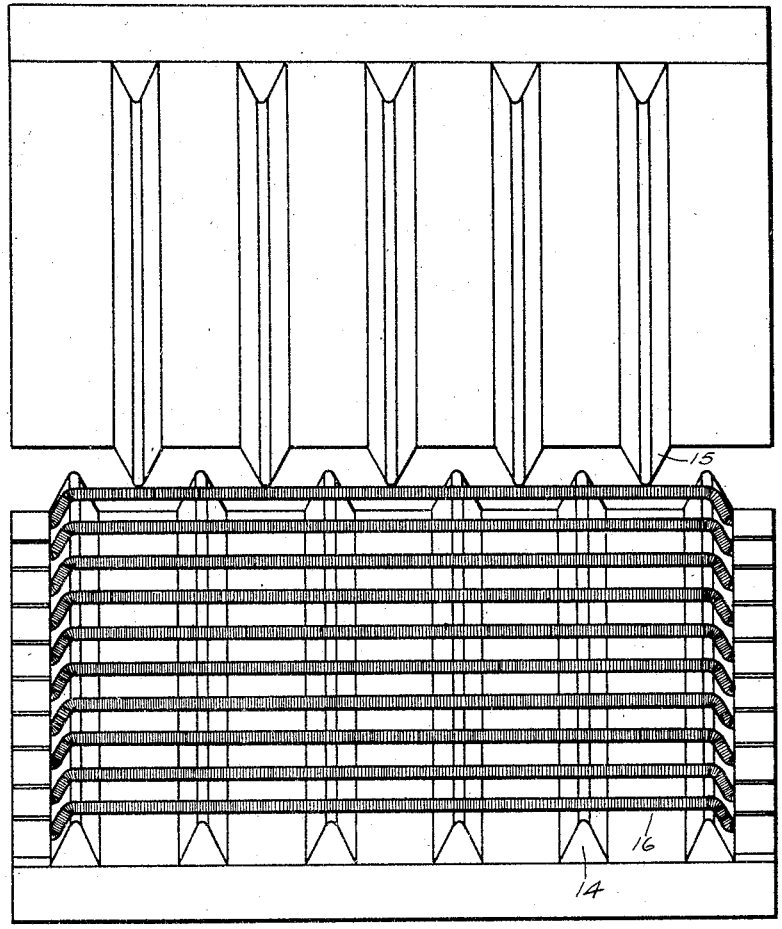
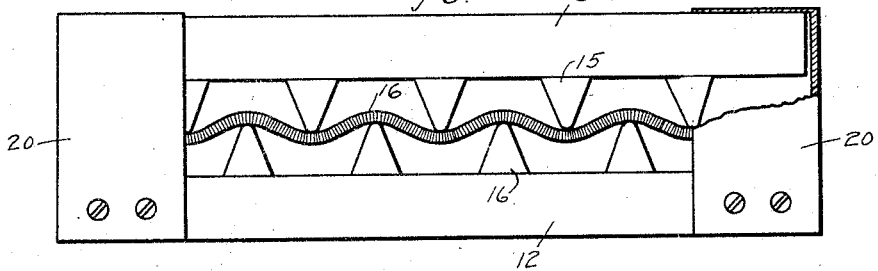

UNITED STATES PATENT OFFICE.

PERCY W. BRIDGMAN, OF CAMBRIDGE, MASSACHUSETTS.

VIBRATION-ABSORBING MOUNTING.

1,377,556.　　　　Specification of Letters Patent.　　Patented May 10, 1921.

Application filed September 6, 1919. Serial No. 322,272.

*To all whom it may concern:*

Be it known that I, PERCY W. BRIDGMAN, a citizen of the United States, residing at Cambridge, in the county of Middlesex and State of Massachusetts, have invented new and useful Improvements in Vibration-Absorbing Mountings, of which the following is a specification.

The present invention relates to a vibration absorbing mounting and particularly to a vibration absorbing mounting for machinery or the like to prevent the vibration of the machinery from being transmitted to its support. The vibration absorbing mounting may also be used to prevent vibrations from being transmitted to the apparatus mounted thereon. Although applicable to vibrations of all frequencies, it is particularly applicable to absorbing vibrations of acoustical frequencies. This mounting is of particular application to the mounting of engines, pumps, dynamos, and the like, on shipboard so as to prevent the vibrations from being communicated to the ship's frame and thereby to the water, making possible a more quiet ship and one more difficult to detect by submarine listening devices.

Referring to the drawings, Figure 1 is a perspective view of a platform provided with the vibration absorbing mounting. Fig. 2 is a perspective view of one of the mounting pads. Fig. 3 is an end elevation of the mounting pad. Fig. 4 is a side elevation of the mounting pad. Fig. 5 is a section along the line V—V of Fig. 4. Fig. 6 is a side elevation of a modification. Fig. 7 is a perspective view of the modification shown in Fig. 6 with the top and bottom plates spread apart like jaws to show the springs, the corner guides being removed.

Referring to the illustrated embodiment of the invention, reference numeral 1 indicates the platform upon which the machine or other apparatus is to be mounted. This platform is supported by the vibration absorbing mountings indicated in Fig. 1 as four mountings or pads placed under the corners of the plate.

Referring particularly to Figs. 2 and 5, the vibration absorbing mounting comprises a supporting member or plate 2 and a supported member or plate 3. The plate 2 has a plurality of upright ribs 4. The plate 3 has a plurality of downwardly extending ribs 5, which are alternately spaced with respect to the ribs 4. While it is usually preferable to make both the supporting and supported members with a plurality of ribs, it is obvious that one member may have two ribs between which the springs are stretched, and the other members have a single rib bearing on the springs between the ribs of first member. The ribs 4 and 5 form bearing points or members acting against the springs 6 which are stretched across them. The springs 6 are preferably flexible, strong, steel helical springs. The springs are preferably put under some initial tension, and the ends of the springs are held by cross bars 7, at the outside ribs 4. When weight is put upon supported plate 3, the springs 6 are displaced laterally in respect to their axes, in a downward direction, at the points of contact with the ribs 5. This causes the springs to assume the undulating form shown in Fig. 1. The downward thrust of the ribs 5 is resisted by the upward components of the tension of the spring. The resistance of the springs is primarily due to their lengthwise tension and not to their lateral stiffness, as the helical steel springs are flexible and have but little lateral stiffness.

In the form of the invention shown in Figs. 2 and 5, the ribs at 4 and 5, have holes through which are passed the springs 6. This obviates any danger of the mounting coming apart and adapts it for use as a supporting mounting of the suspension type. For example, the upper plate 3 may be fixed to an overhead support and the apparatus to be mounted may be hung from the plate 2. The mounting may also be placed in a vertical position, one of the plates being fastened to a wall.

As shown in Fig. 1, four mountings are placed under the corners of the support platform 1. The mounting pad 10 has its ribs extended at right angles to the adjacent mounting pad 11. This is for the purpose of preventing the ribs from sliding longitudinally along the springs. Any tendency of the downwardly extended ribs 5 of the mounting 10 to slide along the springs will be resisted by the mounting 11, in which the ribs run in the opposite direction.

Figs. 6 and 7 illustrate a modification in which the springs 16, are stretched over the tops of the ribs 14, instead of passing through holes therein. The ribs 15, of the supported member, bear against the springs 16, at points intermediate to ribs 14. The sidewise displacement or separation of the supported and supporting plates 12 and 13, is prevented by corner guides 20, which form a loose fit around the corners of the upper plate 13, permitting it to move downward when weight is placed upon it.

The springs effectively prevent the transmission of vibrations from the supported to the supporting plate or vice versa. The ribs 4 and 5, can vibrate relatively to each other in a direction longitudinal to the axes of the springs 6, the vibration being absorbed by the small lengthening and shortening of the spring lengths between the ribs. The ribs 4 and 5 are also free to vibrate relatively to each other in a plane at right angles to the axis of the springs 6. Vibrations in this plane, whether vertical or horizontal, cause small displacements of the points of bearing of the ribs on the springs in a direction at right angles to the axis of the springs, the springs lengthening and shortening to permit this. It will be seen that no component of the relative vibration between the supported and supporting plate is resisted by a rigid connection between them, but every component is resisted by a yielding spring tension which effectively prevents the transmission of the vibrations.

The mountings may be made up in units as shown in Figs. 2 to 5 and applied as needed beneath the apparatus to be supported as shown in Fig. 1. If greater weight is to be carried the springs may be made heavier or their number may be increased. If a light weight is to be carried, rubber bands may be advantageously employed in place of the helical springs. The form shown in Figs. 6 and 7 is particularly adapted to use with rubber bands. The term flexible tension spring, as used in the claims, is intended as a term of description and not of limitation and to include such forms of spring-like members as rubber bands or the like, which have the property of being flexible to transverse bending, but which exert an endwise tension.

The present invention is not limited to its illustrated embodiment but may be embodied in other structures within the scope of the following claims:

I claim:

1. A vibration absorbing mounting comprising supporting and supported members having spaced opposing bearing points and a flexible tension spring extending across the bearing points, and adapted to be laterally displaced by the thrust of the supporting and supported members, exerted upon the spring at the bearing points, substantially as described.

2. A vibration absorbing mounting comprising opposed supporting and supported members having spaced opposing bearing members and a plurality of flexible extensible tension members stretched across the bearing members and compressed laterally between them, forming yielding connections between them at a plurality of points distributed along the tension members, substantially as described.

3. A vibration absorbing mounting comprising supporting and supported plates having alternately disposed opposing ribs, and a plurality of flexible tension springs extended across the ribs parallel to the plates and forming yielding connections between them, substantially as described.

4. A vibration absorbing mounting comprising supporting and supported plates having alternately disposed opposing ribs and a plurality of helical springs stretched across the ribs parallel to the plates and forming yielding connections between the two sets of ribs, substantially as described.

5. A vibration absorbing mounting comprising supporting and supported plates provided with alternately disposed oppositely extending ribs, having alined holes therethrough and a plurality of tension springs extending across the ribs, through the holes, parallel to the plates, and forming yielding connections between the two sets of ribs, substantially as described.

6. A vibration absorbing mounting comprising opposed supporting and supported members and three equal ribs, one of said members having two of the ribs and a plurality of flexible tension springs extending between them, the other of said members having the third rib laterally compressing the tension springs at points between the first mentioned ribs, substantially as described.

7. A vibration absorbing mounting comprising supporting and supported members, one of said members having two spaced bearing points and a flexible tension member extending between them, and the other of said members having a bearing point engaging the tension member at a point between the two first mentioned bearing points and by its thrust displacing the tension member at that point, the thrust being yieldingly resisted by the opposing component of the longitudinal tension of the tension member, substantially as described.

PERCY W. BRIDGMAN.